United States Patent
Mokhtari et al.

(10) Patent No.: US 10,991,041 B2
(45) Date of Patent: Apr. 27, 2021

(54) NEXT-GENERATION ENERGY MARKET DESIGN AND IMPLEMENTATION

(71) Applicant: Open Access Technology International, Inc., Minneapolis, MN (US)

(72) Inventors: Sasan Mokhtari, Eden Prairie, MN (US); Haso Peljto, Brooklyn Park, MN (US); Ilya William Slutsker, Plymouth, MN (US); Carlos Gonzalez-Perez, Maple Grove, MN (US); Scott Arcand, New Brighton, MN (US); Guillermo Irisarri, Plymouth, MN (US)

(73) Assignee: OPEN ACCESS TECHNOLOGY INTERNATIONAL, INC., Minneapolis, MN (US)

( * ) Notice: Subject to any disclaimer, the term of this patent is extended or adjusted under 35 U.S.C. 154(b) by 532 days.

(21) Appl. No.: 14/875,000

(22) Filed: Oct. 5, 2015

(65) Prior Publication Data

US 2016/0098794 A1 Apr. 7, 2016

Related U.S. Application Data

(60) Provisional application No. 62/059,551, filed on Oct. 3, 2014.

(51) Int. Cl.
*G06Q 40/04* (2012.01)

(52) U.S. Cl.
CPC .................................. *G06Q 40/04* (2013.01)

(58) Field of Classification Search
CPC ........ G06Q 40/04; G06Q 50/06; G06Q 10/04; G06Q 30/08
See application file for complete search history.

(56) References Cited

U.S. PATENT DOCUMENTS

| | | | | |
|---|---|---|---|---|
| 7,343,360 | B1* | 3/2008 | Ristanovic | G06Q 30/08 705/412 |
| 8,583,520 | B1* | 11/2013 | Forbes, Jr. | G05D 17/00 705/34 |
| 9,865,024 | B2* | 1/2018 | Mokhtari | G06Q 50/06 |
| 2003/0041002 | A1* | 2/2003 | Hao | G06Q 30/06 705/37 |
| 2005/0137959 | A1* | 6/2005 | Yan | G06Q 20/102 705/37 |

(Continued)

*Primary Examiner* — Scott S Trotter
(74) *Attorney, Agent, or Firm* — Vidas Arrett & Steinkraus P.A.

(57) ABSTRACT

A process/method is provided for the next generation of electricity market systems that support competitive trading of electric energy and ancillary services within day-ahead and real-time market operation frameworks. The invention comprises the systems and methods related to advances in electricity market architecture, functionality, and performance. The systems and methods of the invention ensure system operation reliability and maximize market economic efficiency of energy and ancillary services trading in competitive market environment. A process/method comprising optimal clearing and competitive price formation for a variety of market commodities that are supplied and consumed by a numerous market entities of a variety of types. The solution process is arranged and facilitated in controllable and efficient manner.

16 Claims, 4 Drawing Sheets

(56) References Cited

U.S. PATENT DOCUMENTS

2012/0130556 A1* 5/2012 Marhoefer ............... H02J 3/32
                                                    700/291
2015/0221030 A1* 8/2015 Aganagic ............... G06Q 40/04
                                                    705/7.21

* cited by examiner

NEXT-GENERATION ENERGY MARKET DESIGN AND IMPLEMENTATION

CROSS-REFERENCE TO RELATED APPLICATIONS

This application claims priority to U.S. Provisional patent application No. 62/059,551 filed Oct. 3, 2014, the entire content of which is hereby incorporated by reference.

STATEMENT REGARDING FEDERALLY SPONSORED RESEARCH

Not Applicable

FIELD OF THE INVENTION

The present disclosure relates generally to the design and implementation of next generation electricity market systems that support competitive trading of electric energy and ancillary services within day-ahead and real-time market operation frameworks. In particular, the present disclosure relates to constructs, systems, processes and methods of ensuring electric power system reliability while maximizing economic efficiency of electricity market operation and providing competitive market commodity clearing prices.

BACKGROUND OF THE INVENTION

The electricity industry has been undergoing restructuring processes for more than two decades. Current systems used by electricity markets were designed many decades ago, prior to the profound changes that have been ongoing in the industry since their adoption. The paradigm of vertically integrated monopolistic electric utilities has been transformed into decentralized electricity market environments where electric energy and ancillary services are traded in a competitive manner. The forces of competitive market economy are the main factors improving economic efficiency of overall electric power system operation.

The design, implementation and operation of electricity market systems have been facing policy, interest groups, and information technology challenges. These factors impact market design, business models and operation procedures and limit market system efficiency, quality and performance. Most profound has been the impact presented by SmartGrid technologies and the inclusion of distribution-level grid assets into the composite offerings at the wholesale level by energy industry participants. The systems currently being used were not designed to incorporate such variable resource assets, real-time data updates, Big Data level analytics and representations such as geo-spatial representations and the like, as well as the ongoing complex structure of physical and cyber security protocols, standards, and requirements. As a consequence, the expected effects of electricity market restructuring are not achieved and numerous unintended operational and business issues are created.

The addition of multiple types and sources and complexity of some generating facilities and the extreme number of participating entities could not be considered in an appropriate manner. For instance, it was inconceivable twenty years ago to anticipate that a battery could be considered as a generation resource that could impact reliability of the electric grid or that could be bid into an electricity market as an available resource, spinning or non-spinning Because of this expansion and the inability of current systems to incorporate such additional resources as actual data inputs, approximations and aggregations are currently used to be able to facilitate and optimize market operation. There are obviously errors with the use of such approximations and aggregations. These modelling deviations impact market outcomes for all market participants due to electric power system physical interdependencies.

The limited capabilities of information technology available in current market systems enforce reduction of information flows and storage volumes. Even if the final outcomes of electricity market operation may not be impacted, the situation awareness, execution controllability and operation analysis are limited. The needs of a variety of market operation groups (policy makers, designers, operators, supervisors, monitors, auditors) can only be fulfilled in a degraded manner below the critical level. As a result, there are actual needs of these stakeholders that are not being met by the currently available systems.

The development of smart grid technologies has impacted the energy industry in fundamental ways. Not only are increasing numbers of decentralized grid assets becoming available to be incorporated into models, the impact on the energy markets has not been understood. Increasing levels of smart grid technologies, generation resources and demand responses require additional policies, market rules and pricing mechanisms to facilitate appropriate market participation. The granularity and high number of these devices create information issues as well. The existing business models and market operation capabilities are not capable to support smart technology deployment in a reliable and efficient manner.

The experiences and learned lessons over last several decades in the electricity industry restructuring allow further advances in policies, concepts and methodologies of electricity market design and implementation. The advances in information and computation technology open the space for additional market features, accurate presentations, advanced usability, and improved performances.

The experience in electricity market design and operation established the confidence in competitive electricity markets. At the same time, the ways for addressing existing issues and further improvements of market participant benefits are also possible. The alignment of market clearing and pricing outcomes with business objectives of market participants is a remaining task for the next generation market systems as well. As a consequence, the quality of market commodity awards and pricing signals represent motivational incentives for market participants toward efficient operation of overall electricity markets.

BRIEF SUMMARY OF THE INVENTION

In general, this disclosure is directed toward systems and methods for the next generation of electricity market systems to provide advances in system reliability, market efficiency and solution quality while considering smart grid technologies that bring in distributed, decentralized grid asset data and information, and while facing large numbers of a variety of market participants and system user groups.

The invented systems and methods leverage market operation experiences and utilize advances in information technology, optimization techniques, computation capabilities, and man-machine interaction. In some embodiments, the discloser may support further evolution of electricity market policy, design, and deployment in a variety of market operation settings.

The architecture of disclosed system supports the external and internal data transfers, input/intermediate/output data archival, save case management, multiple market execution workspaces, and a tree of solution sequences. Also, the computation capabilities of multi-processor and multi-thread servers support parallel information processing within market execution timeline for advanced market features and mathematical models of business objectives and physical characteristics. The advanced system architecture mitigates limitations on timely achievement of overall market operation optimality which currently available systems cannot provide.

The invented system is configurable to be capable to support a variety of electricity market arrangements, market design rules and market commodity settlement determinants. The execution timeline is configurable to accommodate execution times, time interval lengths and trading period duration suitable for day-ahead and real-time market frameworks. The functionality and setting parameters of the system are configurable to support clearing and pricing for multiple market commodities as well as optimal resource commitments to maintain system reliability in day-ahead and real-time markets.

The invented system creates a separate workspace for every market run in operation or study environments. The operation workspace is restricted to the market operator, supervisor and monitor users, while study workspaces can be used by a variety of analysts and auditors. The viewing and editing permissions depend on user authority and data privacy policy.

In each workspace a solution sequence tree can be created for a variety of objectives and strategies of analysis. A tree branch can be added and any tree leaf can be selected as the final solution at any point of time. A branch of the solution sequence is created according to the invention's workflow controller diagram. The viewing and editing of complete input data and analyzing intermediate results is supported at each step of workflow controller execution. After market run completion, the complete workspace is stored and can be retrieved from archive at any later time.

The execution is organized in pre-defined orders of steps performed by the workflow controller. This is a novel implementation not otherwise used or anticipated through any currently available market system. The market optimal clearing is organized into two iteration processes: Security Constrained Unit Commitment (SCUC) and Network Analysis (NA) iteration loop, and nested Security Constrained Economic Dispatch (SCED) and Network Analysis (NA) iteration loop. The SCUC-NA iteration loop is executed until the transmission system feasibility and market clearing optimality is achieved. The SCED-NA iteration loop is entered only if transmission system feasibility is achieved to consider network nonlinearities and improve resource dispatch quality. As the final outcome of market clearing represent optimal resource commitments, energy and ancillary service awards without transmission line overloads.

The SCUC engine determines resource commitment statuses and energy and ancillary service awards in optimal manner maximizing economic efficiency of overall electricity market. The energy and ancillary service are co-optimized and transmission congestion costs are minimized. The market energy supply and demand are balanced and regional ancillary services requirements are satisfied within transmission line power flow limits. Resource constructive and physical characteristics are considered to provide high operational quality of cycling and dispatches. The import, export, point-to-point, and virtual energy transactions are scheduled in optimal manner as well.

The SCED engine determines optimal energy and ancillary service awards respecting resource commitments determined by the SCUC engine. The energy and ancillary service are co-optimized and transmission congestion costs are minimized. The market energy supply and demand are balanced and reginal ancillary services requirements satisfied without transmission line overloads. Detailed resource constructive and physical characteristics are considered to provide high operational quality of cycling and dispatches. The import, export, point-to-point and virtual energy transactions are scheduled in an optimal manner as well. The convergence tolerances are tightened to improve numerical accuracy and operational quality of resource dispatches.

An NA engine embedded within both of the SCUC NA and SCED NA loops performs base case power flow calculations for given energy generations and consumptions determined by SCUC and SCED engines. The AC power flow model is used and a fast-decoupled solution methodology deployed. The slack power distribution is performed in proportion to the ratio of loss factor and clearing price to be aligned with optimization objective of SCUC and SCED engines. The base case transmission line power flows are calculated and highly loaded transmission lines are selected to be considered by SCUC and SCED engines. The base case transmission line constraints are formulated in incremental linearized form.

The SCUC NA and SCED NA loops performs analysis of a number of contingencies to determine impacts on base case power flows. The DC power flow model is used and incremental solution methodology deployed. A variety of single and multiple generation and transmission line contingencies are considered. The transmission line contingency power flows are calculated and highly loaded transmission lines are selected to be considered by SCUC and SCED engines. Only a number of worst transmission line contingency power flows are selected. The contingency transmission constraints are formulated in the same incremental linearized form as base case transmission constraints.

The final solution of electricity market clearing presents the optimal energy and ancillary service awards that maximize overall market economic efficiency and provides system operation reliability. The market clearing prices for awarded energy and ancillary service quantities are determined by the pricing engine. The pricing engine is designed considering the fundamental principles of competitive market economy: economic efficiency, participation rationality, incentive compatibility, price transparency, and budget balance. The market economic efficiency is provided by market commodity clearing performed by SCUC and SCED engines, while participation rationality, incentive compatibility, price transparency and budget balance are design objectives for the pricing engine. The common policy for electricity markets is marginal price formation mechanism that cannot be incentive compatible and it remains to be subject of market power mitigation measures. A variety of configurable price formation mechanisms for marginal market clearing prices is provided for awarded energy and ancillary service quantities.

The pricing engine is configurable to perform the following pricing schemas:
  a) Dispatching pricing schema where only flexible market commodities are priced
  b) Relaxed pricing schema where fixed market commodities are relaxed to be able to set clearing prices in a hypothetical system dispatch c) Partial commitment pricing schema where resource commitments are relaxed to be able to set clearing prices allowing fractional resource commitments, and
d) Advanced pricing schema where both fixed and flexible market commodities can set clearing prices preventing awarded energy and ancillary service quantities.

The pricing engine can be executed in a variety of configurations and resulting clearing prices can be analyzed and compared.

The details of one or more aspects of the disclosure are set forth in the accompanying drawings and the description below. Other features, objects, and advantages will be apparent from the description, drawings and mathematical formulations that are summarized in the claims.

DETAILED DESCRIPTION OF THE INVENTION

While this invention may be embodied in many forms, there are specific embodiments of the invention described in detail herein. This description is an exemplification of the principles of the invention and is not intended to limit the invention to the particular embodiments illustrated.

In general, this disclosure is directed toward the next generation of electricity market systems that accommodate the advances of the existing electricity market platforms enhanced to deploy the latest developments in smart grid and distributed generation equipment, information technology, auction design theory and optimization algorithms. These advances of electricity market systems support evolutionary development of energy policy, market design rules, business models, and operation practices.

Figure 2:
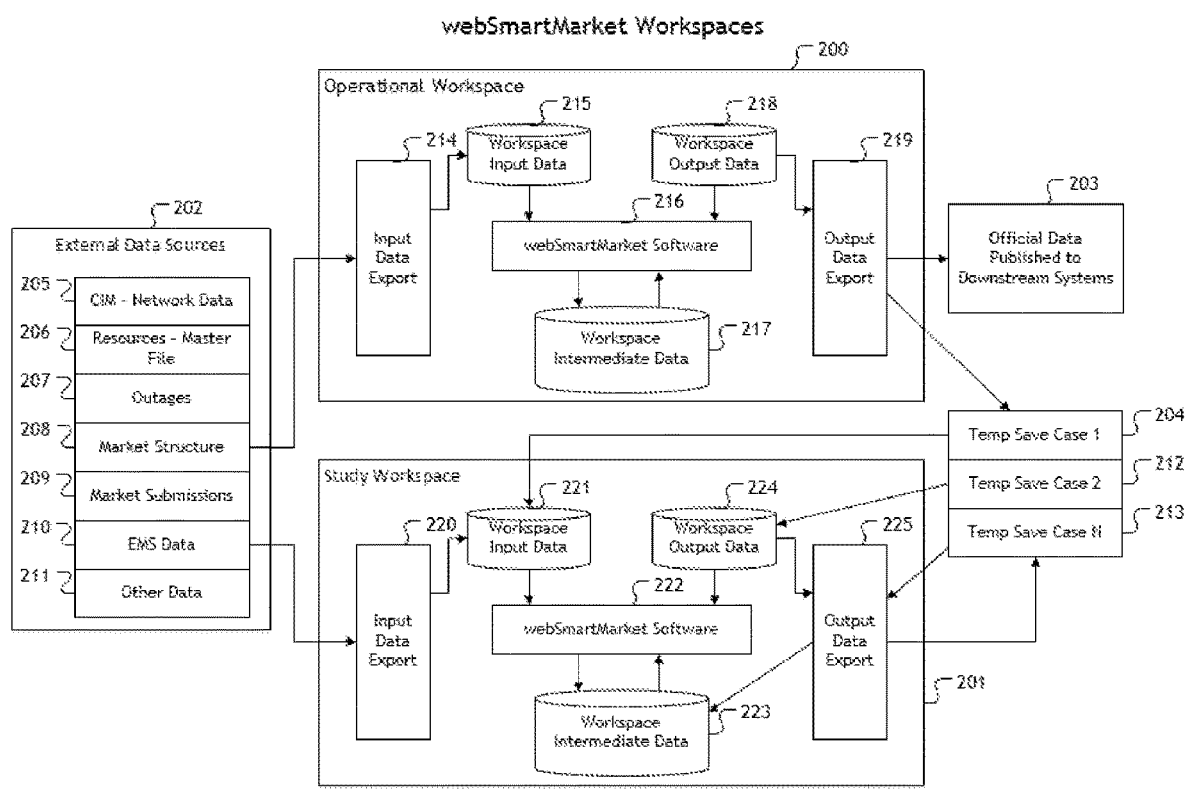
FIG. 2 is a diagram illustrating the designed system operation and study workspaces, and save case management and archival.

Referring to FIG. 2, which is a diagram illustrating the system's workspace provides complete recording of current operation 200 and archival of historical information 201. The operation and study workspaces are maintained by save case mechanism 204 to support controllable electricity market operation, auditing re-runs and study analysis.

Figure 1:
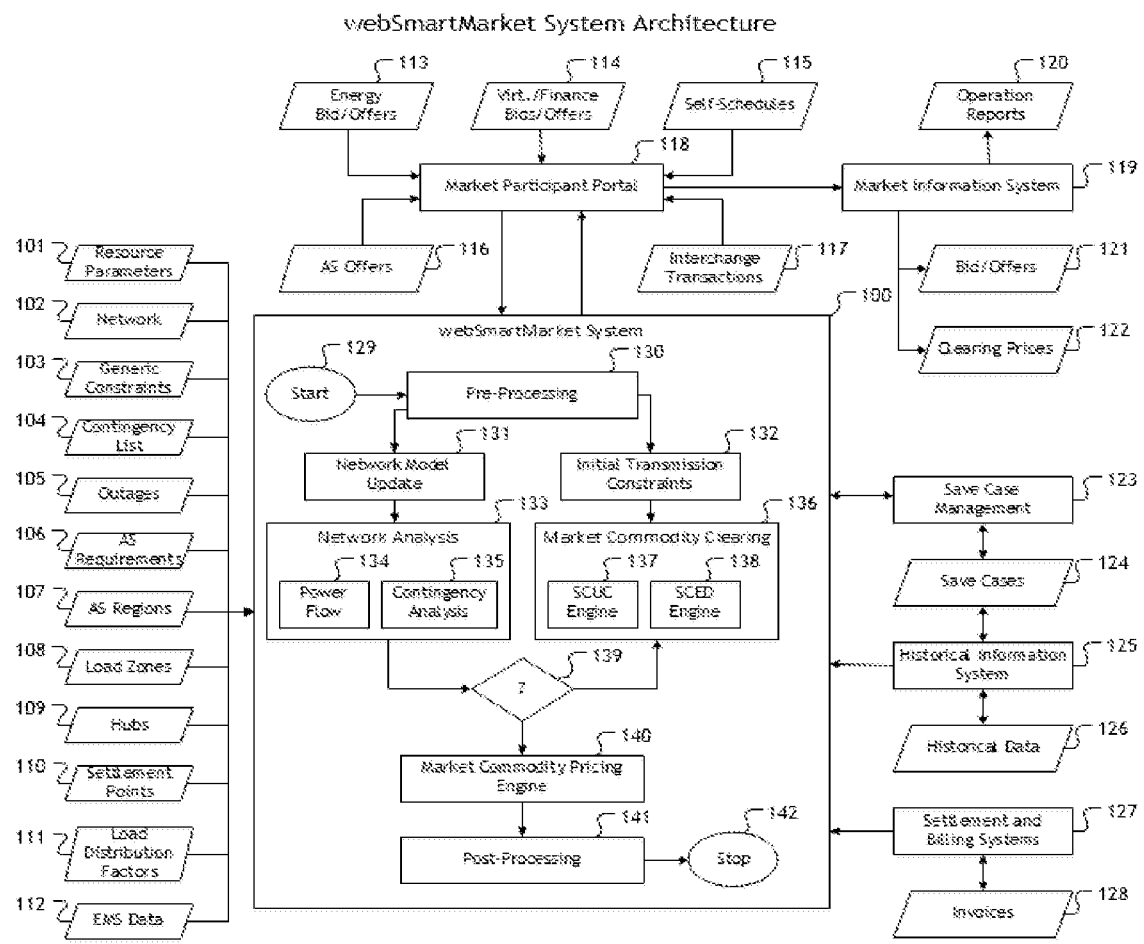
FIG. 1 is a diagram illustrating the platform architecture and data transfers of the designed system.

The system deploys the state-of-the-art technology of graphical user interface that provides situation awareness, execution controllability and information usability of electricity market clearing and pricing processes. This process is shown in FIG. 1. The display information contents, presentation formats and man-machine interaction of system provide easy, efficient and robust system operation.

The system comprises a variety of configuration parameters, including but not necessarily limited to, resource parameters 101, network model 102, generic constraints 103, contingency list 104, outages 105, AS Requirements 106, AS regions 107, Load Zones 108, Hubs 109, Settlement Points 110, Load Distribution Factors 111, and EMS data 112 as well as an interface with a Market Participant Portal 118 that gathers energy bid/offer 113, virtual and financial bids and offers 114, self-schedule 115, AS Offers 116, and Interchange Transaction 117 data to be able to support operation of the existing electricity markets as well as support advances into the next stage of electricity industry restructuring. The manual/automatic execution options, market commodity activation 136, market type selection and timeline configuration provide settings appropriate for a variety of electricity market arrangements. The features and alternative models can be selected according to objectives of system operation and analysis. The thresholds, tolerances and optimization parameters are enterable to provide adequate accuracy and performances. In some embodiments, the system may also provide functionality for saving cases 123 and various historical data 125 known in the art. Other embodiments of the system may also comprise of functionality to facilitate the export of invoices 128.

The system considers a variety of energy generation and consumption resources with detailed representation of their operating capabilities. In addition to thermal, nuclear and hydro generating units, a variety of intermittent generating resources (solar, wind, biomass, geothermal) are considered. The complexity of operation of joint owned units, energy storage resources and combined cycle plants are represented into details in optimization mathematical models. The dispatchable and interruptible load resources are considered as well. The generation costs are presented with three-part energy offers, while consumption benefits are presented by three-part bids. The offer and bid price curves can be step-wise or piece wise linear functions.

Non-resource specific trading is supported by the system to accommodate competitive and reliable arrangements for import, export, point-to-point and virtual transaction 113, 114. A point of delivery and point of receive can be any settlement point type (pricing node, load zone 108, trading hub 109).

A variety of ancillary service types and product characteristics can be procured in system 106, 107, 116. The procurement of regulation up, regulation down, spinning reserve, and supplemental online and offline reserves is supported. Regional ancillary service requirements are enforced and ancillary service substitution is accommodated where higher quality ancillary services can be used instead of lower quality ancillary services.

Ancillary service substitution mechanism is configurable to support regulation up, spinning reserve and supplemental online reserve cascading. The regulation up can be used instead of spinning reserve and supplemental online reserve, while spinning reserve can be used instead of supplemental online reserve.

Figure 3:
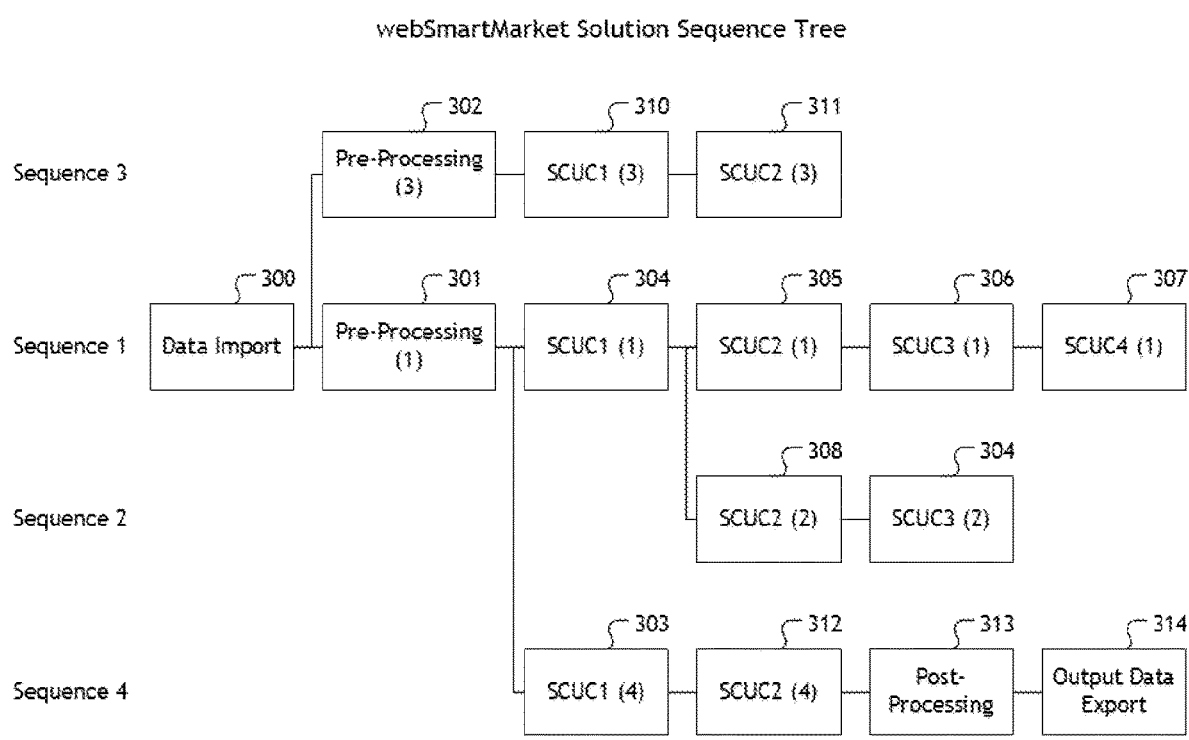
FIG. 3 is a diagram illustrating a system solution sequence tree.
Figure 4:
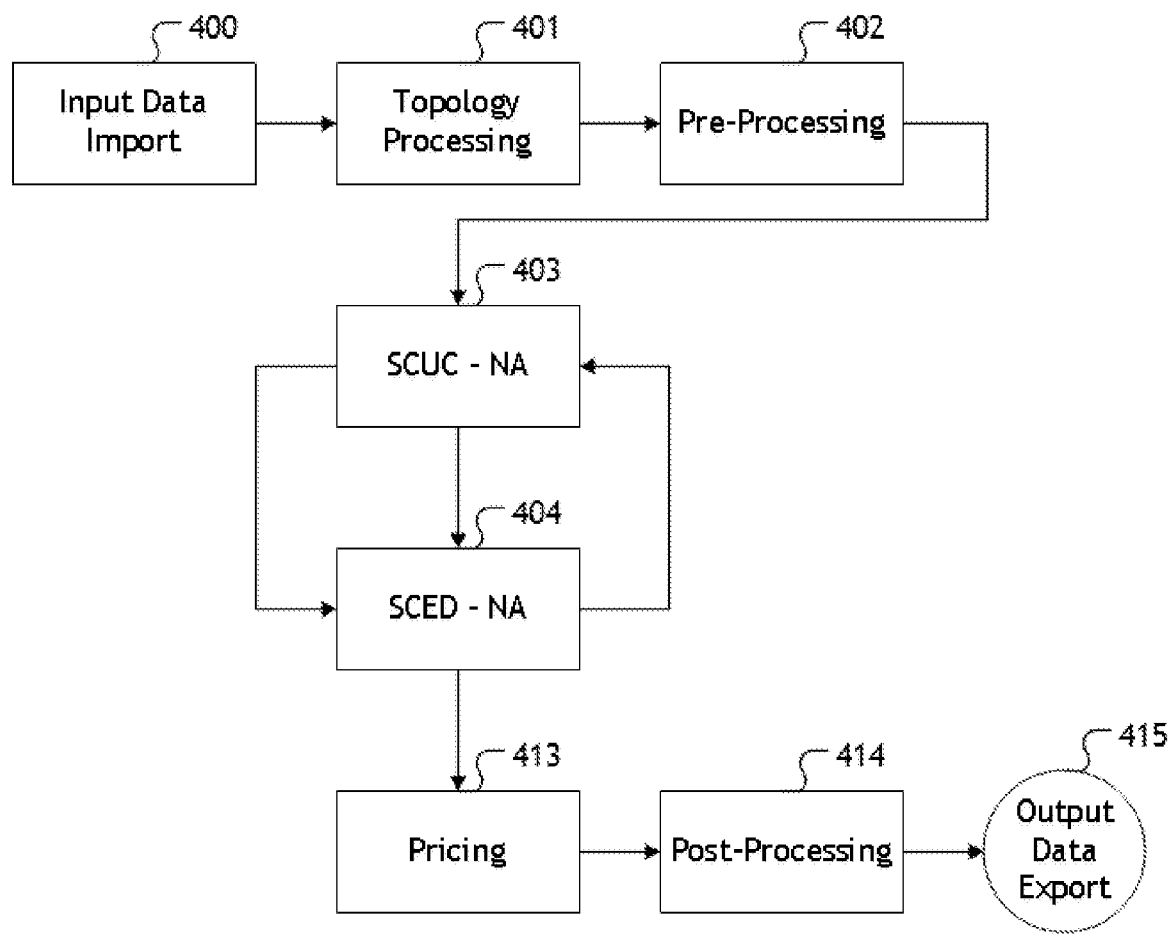
FIG. 4 is a diagram illustrating a system work flow controller execution.

The execution of the system is facilitated by a work flow controller as illustrated by FIG. 4 and supported by workspaces FIG. 2 and solution sequence trees FIG. 3. The execution of workflow controller creates a branch on the solution sequence tree. The workflow controller represents a strategy and methodology to achieve the optimal outcomes of electricity market clearing and pricing. Execution of workflow is directly configurable by breakers located between execution boxes representing calculation engines. The breaker setting can be changed at any time and execution of workflow controller stops at first open breaker according to the execution diagram. At the stop point, both input data and output results of any executed calculation box can be reviewed and edited. The calculation box can be re-executed at any stopping point and the solution sequence can continue to the next open breaker. The final solution is selected by the operator.

The workflow controller facilitates execution of the following calculation boxes:

1. Topology Processor determines network topology based on nominal breaker statuses and transmission equipment outages 401.
2. Pre-Processor validates existence, interdependencies and consistency of input market data 402.
3. SCUC engine 137 determines optimal resource commitments and energy and ancillary service awards maximizing market economic efficiency through SCUC-NA loop 403.
4. SCED engine 138 determines optimal energy and ancillary service awarded quantities for optimal resource commitments determine by SCUC engine 137 maximizing market economic efficiency 404.
5. NA engine 133 calculates base case 134 and contingencies 135 power flows and formulates transmission constraints within SCUC-NA loop 403 and SCED-NA loop 404.
6. Pricing engine calculates settlement prices for awarded quantities of market commodities 413.
7. Post-Processing validate and delivers approved outcomes of market commodity clearing and pricing to downstream systems 414.

The system workflow controller process, FIG. 4, comprises the execution of SCUC-NA iteration loop 403 to determine feasible and optimal resource commitments and energy and ancillary service awards. The feasibility test verifies transmission line power flow limits while the optimality test verifies change of optimization objective in respect to the convergence tolerance. The search for optimal solution beyond feasibility of transmission constraints represents a novel approach enabled by high performances of SCUC 137 engine. The SCUC-NA iteration loop 403 process is completed if the optimal solution is achieved or the maximal number of iterations is reached.

The system workflow controller process, FIG. 4, also comprises the execution of nested SCED-NA iteration loop 404 to determine feasible and optimal energy and ancillary service awards for optimal resource commitments determined by the SCUC engine 137. The SCED-NA iteration loop 404 is entered when SCUC-NA iteration process 403 achieves a feasible solution. The main purpose of SCED-NA iteration process 404 is to address nonlinearity of AC power flow model without re-commitment of resources. Also, some features can be activated in SCED-NA loop 404 only and tighter optimality tolerances can be used. As a consequence, the optimal solution can be achieved in shorter time and the operational quality of the optimal solution can be improved. The feasibility test verifies transmission line power flow limits while optimality test verifies change of optimization objective as well. The SCED-NA iteration process 404 is completed if the optimal solution is achieved or the maximal number of iterations is reached.

The invention comprises the SCUC 137 and SCED 138 engines to optimize resource commitments and energy and ancillary service awarded quantities that balance market commodity supply and demand, satisfies reginal ancillary service requirements 106 respecting transmission constraints and resource operational capabilities. Both SCUC 137 and SCED 138 engines comprise two-step deployment of optimization solvers:

1. Mixed Integer Linear Programming solver is deployed to optimize binary variables using linear approximations of submitted energy price curves.
2. Quadratic Programming solver is deployed to optimize continuous variables for the optimal values of binary variables and using originally submitted piecewise linear energy price curves.

The system comprises the Pricing Engine 140 to determine settlement prices for awarded quantities of market commodities. In certain embodiments, the pricing schema can be configured to perform dispatching, relaxed, partial commitment and advanced price formation. For each of pricing schema configuration the Quadratic Programming solver is deployed to determine shadow prices for market power balance, regional ancillary service requirements and transmission constraints. These shadow prices are used as determinants to calculate marginal settlement prices for awarded energy and ancillary service quantities.

The SCUC 137, SCED 138 and Pricing 140 Engines of the system comprise tight mathematical formulations of resource constructive and physical characteristics without approximations and aggregations. The novel operational models are tightened to the strongest possible level using convex hull mathematical constructs, as follows:

a) The resource status, startup and shutdown binary variables are formulated using convex combinations of vertex points that represent physically possible states.
b) Resource operating and regulating ranges are formulated using disjunctive region constructs.
c) Static ramping limits are represented as tight constraints comprising resource status, startup and shut down variables as well as resource power outputs in two subsequent time intervals.
d) Dynamic ramping limits are represented as tight constraints comprising different ramp rates in a number of segments within resource power output range.
e) Resource startup cost functions are modeled for hot, warm, and cold warmth states using warmth state variables.
f) Resource minimum up and down times are formulated in tightest possible form.
g) Commitment model for joint owned units enforces simultaneous commitments for joint owned unit shares.
h) Dynamic model for energy storage resources considers storage capacities and charging/discharging resource cycling.
i) Multi-state model of combined cycle plant operation considers configuration transition matrix and transition times.

The system and methods of the current invention depend on an ordered execution of model-building utilizing various mathematical processes known in the art and the innovative order and collection of input elements entered into or otherwise obtained by the invention. In one particular embodiment, the invention comprises a system and method for determining market commodity clearing utilizing an objective function for the optimization objective of the inventive system to represent the economic efficiency of overall market operation in each market environment. Such objective functions are configurable depending on the specific market environment and may be comprised of elements such as energy consumption benefits and interruption costs of load entities, commitment costs and energy production costs of generation entities, ancillary service costs for both load and generation entities, offer costs for energy selling transactions, bid benefits for energy buying transactions, and penalties for system power imbalance, ancillary service scarcity and transmission line overloads.

Accordingly, the optimization objective is the maximization of economic efficiency of overall market operation that, for certain embodiments, may be presented in the following mathematical form:

$$\max \left\{ EB_{market}^{total} = \right.$$

$$\sum_{n \in T} \sum_{l \in L} \left[ -LIC_l^t \cdot r_l^t - LCC_l^t \cdot (1 - u_l^t) + EBB_l^t(P_l^t) - \sum_{AStype} ASC_l^t(R_l^t) \right] -$$

$$\sum_{t \in T} \sum_{g \in G} \left[ SUC_g^t(H, I, C) \cdot s_g^t + MEC_g^t \cdot u_g^t + \right.$$

$$EOC_g^t(P_g^t) + \sum_{AStype} ASC_g^t(R_g^t) \right] + \sum_{t \in T} \sum_{v \in VB} EBB_v^t(P_v^t) +$$

$$\sum_{t \in T} \sum_{w \in WB} EBB_w^t(P_w^t) - \sum_{t \in T} \sum_{v \in VO} EOC_v^t(P_v^t) - \sum_{t \in T} \sum_{w \in WO} EOC_w^t(P_w^t) +$$

$$\sum_{t \in T} PBP_{over}(P_{over}^t) + \sum_{t \in T} PBP_{under}(P_{under}^t) +$$

$$\left. \sum_{t \in T} \sum_{ASregion} \sum_{AStype} ASP_{under}(AS_{under}^t) + \sum_{t \in T} \sum_{line \in N} TCP_{line}^{over}(F_{line}^{over;t}) \right\}$$

In some embodiments, the invention may further comprise systems and methods to model and utilize energy offers and bids. Energy offers represent minimal prices to sell energy for physical deliveries or virtual trades. An energy offer price curve can be non-decreasing stepwise or piecewise linear curve with up to ten segments that are optimized by a Quadratic Programing solver. In the preferred embodiment, the piecewise linear energy offer price curves are approximated as stepwise price curves to be optimized by a linear Mixed Integer Linear Programing solver.

In a non-limiting example of the preferred embodiment, for each segment s of energy offer curve a separate energy variable is introduced as follows:

$$P_{offer} = \sum_{seg} P_{seg}^{offer}; \, 0 \le P_{seg}^{offer} \le P_{seg}^{max}$$

In this case, energy offer cost curves can be presented in the form:

$$EOC^{offer} = \sum_{seg} (a_{seg}^{offer} + EOP_{seg}^{offer} \cdot P_{seg}^{offer})$$

for piecewise linear cost curve, or $$EOC^{offer} = \sum_{seg} \left( a_{seg}^{offer} + b_{seg}^{offer} \cdot P_{seg}^{offer} + 0.5 \cdot EOC_{seg}^{offer} \cdot (P_{seg}^{offer})^2 \right)$$

for piecewise quadratic cost curve.

Energy bids represent a maximal price to buy energy for physical consumption or virtual trading. An energy bid price curve can be non-increasing stepwise or piecewise linear curve with up to ten segments that are optimized by a Quadratic Programing solver. In the preferred embodiment, the piecewise linear energy bid price curves may be approximated as stepwise price curves to be optimized by a linear Mixed Integer Linear Programing solver.

In a non-limiting example of the preferred embodiment, for each segment of energy bid curve a separate variable is introduced:

$$P^{bid} = \sum_{seg} P_{seg}^{bid}; \, 0 \le P_{seg}^{bid} \le P_{seg}^{max}$$

In this case, energy bid benefit curves can be presented in the form:

$$EBB^{bid} = \sum_{seg} (a_{seg}^{bid} + EOP_{seg}^{bid} \cdot P_{seg}^{bid})$$

for piecewise linear energy bid benefit curve, or $$EBB^{bid} = \sum_{seg} \left( a_{seg}^{bid} + b_{seg}^{bid} \cdot P_{seg}^{bid} + 0.5 \cdot EOP_{seg}^{bid} \cdot (P_{seg}^{bid})^2 \right)$$

for piecewise quadratic energy bid benefit curve.

Energy transactions can be specified in a variety of ways depending on trade arrangements. Various embodiments of the inventive systems and methods may utilize any of such transactions known in the art, including but not limited to self-scheduled transactions (import, export, wheeling, point-to-point transactions) submitted as fixed MW schedules which are treated as price takers; fixed transactions (import offers, export bids, up-to-congestion wheeling and point-to-point transactions) submitted as fixed MW quantity to be scheduled or not as whole are treated as interruptible transactions; flexible transactions (import offers, export bids, up-to-congestion wheeling and point-to-point transactions) submitted as priced variable quantity are scheduled in an optimal manner; or time-block transactions (import offers, export bids, up-to-congestion wheeling and point-to-point transactions) submitted as fixed or variable quantity that are scheduled at the same MW level across pre-specified block of time intervals.

In some embodiments, the invention may further comprise system and methods to model and utilize startup cost offers. The startup cost offers represent stepwise non-decreasing functions of resource cooling time. Startup costs are typically offered for hot, warm and cold resource warmth state. The hot-to-warm and warm-to-cold transition times represent resource registered parameters. As a resource can be only in one warmth state at any time interval, only time intervals when a resource starts up are of interest.

One embodiment of the inventive system and methods utilizes models created with the understanding that a resource is in hot state only if unit is shutdown at one of the last few time intervals before startup.

Embodiments may also utilize models created with the understanding that a resource is in warm state only if unit is shutdown in-between hot and cold time intervals before startup.

If resource is not in hot or warm state then it must be in cold state.

Using the above considered understanding, certain embodiments of the invention may represent startup costs as the sum of startup costs for mutually exclusive hot, warm and cold resource warmth state as represented by the below illustrative equation:

$$SUC_t = h_t \cdot SUC_t^h + w_t \cdot SUC_t^w + c_t \cdot SUC_t^c$$

The minimization of increasing startup cost function may then select warmth state with the lowest costs according to above understanding of constraints.

The price for a minimum energy block may be submitted as separate value. The no-load cost can be submitted instead when the first segment of energy offer curve should be extended to zero MW.

In some embodiments, the invention may further comprise systems and methods to model and utilize ancillary service offers. Ancillary service offers represent non-decreasing stepwise price curves of up to five segments, but typically of a single segment. A separate offer is submitted for each ancillary service type (Regulation Up, Regulation Down, Spinning Reserve and Supplemental Reserve).

For each segment of ancillary service offer curve a separate variable may introduced into the inventive system or method. In one particular embodiment, such variable may be:

$$AS^{offer} = \sum_{seg} AS_{seg}^{offer}; \; 0 \leq AS_{seg}^{offer} \leq AS_{seg}^{max}$$

In such non-limiting example, ancillary service offer cost curves can be presented in linear form for each segment:

$$ASC^{offer} = \sum_{seg} (a_{seg}^{offer} + ASP_{seg}^{offer} \cdot AS_{seg}^{offer}).$$

The system power balance is a significant operational requirement in all market environments. One particular embodiment of the invention may comprise systems and methods can express system power balance as balance of the total system generation and the total system consumption including network energy losses. These terms have different expressions in different market environments.

In embodiments of the invention utilized with system trading applications, the total awarded energy offers to sell energy must be balanced with the total awarded energy bids to buy energy plus network energy losses, i.e. awarded energy bids represent delivered energy, as follows:

$$\sum_{g \in G} P_g^t + \sum_{v \in VO} P_v^t + \sum_{w \in WO} P_w^t =$$
$$\sum_{l \in L} P_l^t + \sum_{v \in VB} P_v^t + \sum_{w \in WB} P_w^t + P_{sys}^{loss}(P_{node}^t); \; \forall \, t \in T.$$

The network losses are expressed in incremental linearized form:

$$P_{sys}^{loss}(P_{node}^t) = P_{loss}^{NA;t} + \sum_{node \in N} \alpha_{node}^t \cdot (P_{node}^t - P_{node}^{NA;t}); \; t \in T$$

Where nodal power net injections are:

$$P_{node}^t = \sum_{\substack{g \in node}} P_g^t + \sum_{\substack{v \in node \\ v \in VO}} P_v^t + \sum_{\substack{w \in node \\ w \in WO}} P_w^t - \sum_{l \in node} P_l^t - \sum_{\substack{v \in node \\ v \in VB}} P_v^t - \sum_{\substack{w \in node \\ w \in WB}} P_w^t;$$

node ∈ N; t ∈ T

The Network Analysis determines incremental loss factors $\alpha_{node}^t$, system losses loss $P_{loss}^{NA;t}$ and nodal power injections $P_{node}^{NA;t}$.

In embodiments of the invention utilized with system reliability applications, the total energy generation must be balanced with load resource consumption including non-conforming load schedules and system load forecast adjusted by energy net interchange. The network energy losses are incorporated into system load forecast; i.e. only incremental changes of losses due to resource commitments and re-dispatch are considered, as follows:

$$\sum_{g \in G} P_g^t + \sum_{l \in L} P_l^t = LF_{syst}^t + \Delta P_{sys}^{loss}(P_{node}^t) - NI_{sys}^t; \; \forall \, t \in T$$

Where incremental network losses are expressed in linearized form:

$$\Delta P_{sys}^{loss}(P_{node}^t) = \sum_{node \in N} \alpha_{node}^t \cdot (P_{node}^t - P_{node}^{NA;t}); \; t \in T.$$

Only nower generation at network nodes is considered:

$$P_{node}^t = \sum_{g \in node} P_g^t; \;\; node \in N; t \in T.$$

In some embodiments, the invention may further comprise systems and methods to model and utilize ancillary service requirements. The ancillary service procurement may be accommodated in day-ahead and real-time market timeline domains, while in Reliability Unit Commitment application the awarded ancillary service commodities are preserved.

The ancillary service requirements are enforced for each ancillary service region and each ancillary service type for each time interval. Any qualified generation and load resource can provide ancillary service. In one embodiment of the current invention, the ancillary service requirements are enforced in a cascading manner, i.e. not awarded ancillary service offers for a higher ancillary service quality can be used for lower ancillary service quality. In one embodiment of the current invention, ancillary service substitution is performed in the following ancillary service quality order: regulation up can be used for both spinning reserve and supplemental reserves and spinning reserve can be used for supplemental reserve.

The ancillary service substitution mechanism is configurable and, in some embodiments, may not be allowed. Some embodiments of the described system and methods may accommodate substitution by formulating the ancillary service requirements as follows:

Regulation Down Requirements:

$$\sum_{r \in ASregion} RegDn_r^t \geq Req_{ASregion}^{RegDn;t}; \; t \in T$$

Regulation Up Requirements:

$$\sum_{r \in ASregion} RegUp_r^t \geq Req_{ASregion}^{RegUp;t}; \quad t \in T$$

Spinning Reserve Requirements:

$$\sum_{r \in ASregion} SpinRes_r^t + \sum_{r \in ASregion} RegUp_r^t \geq Req_{ASregion}^{SpinRes;t} + Req_{ASregion}^{RegUp;t};$$
$$t \in T$$

Supplemental Reserve Requirements:

$$\sum_{r \in ASregion} SuplRes_r^t + \sum_{r \in ASregion} SpinRes_r^t + \sum_{r \in ASregion} RegUp_r^t \geq$$
$$Req_{ASregion}^{SuplRes;t} + Req_{ASregion}^{SpinRes;t} + Req_{ASregion}^{RegUp;t}; \quad t \in T$$

The power flow calculations represent determination of solution of network nodal balance equations for active and reactive power utilized in some embodiments of the invention:

$$\Delta P_i^t = \sum_{g \in i} P_g^t - \sum_{l \in i} P_l^t + \sum_{j \in I(i)} P_{i,j}^t = 0; \quad i \in N; t \in T$$

$$\Delta Q_i^t = \sum_{g \in i} Q_g^t - \sum_{l \in i} Q_l^t + \sum_{j \in I(i)} Q_{i,j}^t = 0; \quad i \in N; t \in T.$$

The active and reactive AC power flows for transmission lines, transformers and phase shifters can be expressed in the following unified form:

$$P_{i,j}^t = (\alpha_{i,j} \cdot V_k^t)^2 - (\alpha_{i,j} \cdot V_j^t) \cdot (\alpha_{j,i} \cdot V_j^t) \cdot G_{i,j} \cdot \cos(\theta_{i,j}^t + \varphi_{i,j} - \varphi_{j,i}) -$$
$$(\alpha_{i,j} \cdot V_j^t) \cdot (\alpha_{j,i} \cdot V_j^t) \cdot B_{i,j} \cdot \sin(\theta_{i,j}^t + \varphi_{i,j} - \varphi_{j,i})$$

$$Q_{i,j}^t = (\alpha_{i,j} \cdot V_k^t)^2 \cdot (B_{i,j} + B_{i,j}^{sh}) - (\alpha_{i,j} \cdot V_j^t) \cdot (\alpha_{j,i} \cdot V_j^t) \cdot B_{i,j} \cdot$$
$$\cos(\theta_{i,j}^t + \varphi_{i,j} - \varphi_{j,i}) - (\alpha_{i,j} \cdot V_j^t) \cdot (\alpha_{j,i} \cdot V_j^t) \cdot G_{i,j} \cdot \sin(\theta_{i,j}^t + \varphi_{i,j} - \varphi_{j,i})$$

Where:

$$\alpha_{i,j} = \alpha_{j,i} = 1$$

$$\varphi_{i,j} = \varphi_{j,i} = 0$$

for transmission lines $$\alpha_{j,i}=1; \ B_{i,j}^{sh}=0$$

$$\sigma_{i,j}=\sigma_{j,i}=0$$

for transformers, and $$\alpha_{j,i}=1; \ B_{i,j}^{sh}=0$$

$$\sigma_{j,i}=0$$

for phase shifters.

Continuing the embodiment of the inventive systems and methods, the transmission line power flows may then be represented in incremental linearized form in respect to base case and contingency line power flows that are determined by Network Analysis:

$$F_{line}^t = F_{line}^{NA;t} + \sum_{node \in N} PTDF_{line}^{node} \cdot (P_{node}^t - P_{node}^{NA;t}) \leq F_{line}^{max;t}$$

Where nodal power net injection includes all power supply and demand, if they are present:

$$P_{node}^t =$$
$$\sum_{g \in node} P_g^t + \sum_{\substack{v \in node \\ v \in VO}} P_v^t + \sum_{\substack{w \in node \\ w \in WO}} P_w^t - \sum_{l \in node} P_l^t - \sum_{\substack{v \in node \\ v \in VB}} P_v^t - \sum_{\substack{w \in node \\ w \in WB}} P_w^t;$$

$$node \in N; t \in T.$$

Only active power limits for transmission lines are considered in system optimization. The line active power flow limits are derived from line MVA limits and line reactive power flows.

In some embodiments, the invention may further comprise systems and methods to model and utilize resource operating limits. The convex hull model for status, startup and shutdown variables for a generation resource may be specified.

A resources operates within a variety of power output limits, depending on resource usage and physical capabilities. These limits may comprise economic, operating, and regulating limits.

In resource dispatch the most narrow dispatch limits, i.e. economic limits, for online resources are respected and can be represented within some embodiments of the current system and methods as:

$$P_g^{EcoMin;t} \leq P_g^t \leq P_g^{EcoMax;t}; \ g \in G; \ t \in T$$

In forward market settings the full resource operating range, i.e. operating limits, are considered for energy and ancillary services within some embodiments of the current system and methods as:

$$u_g^t \cdot P_g^{OpMin;t} \leq P_g^t - RegDn_g^t \leq u_g^t \cdot P_g^{OpMax;t}; \ g \in G; \ t \in T$$

$$u_g^t \cdot P_g^{OpMin;t} \leq P_g^t + RegUp_g^t + SpinRes_g^t + SuplRes_g^t \leq u_g^t \cdot P_g^{OpMax;t}; \ g \in G; \ t \in T$$

Some resources can provide regulation service only within a resource regulating range. In this case some embodiments of the current system and methods will enforce the regulating limits instead of operating limits, utilizing:

$$P_g^{OpRegMin;t} \leq P_g^t - RegDn_g^t; \ g \in G; \ t \in T$$

$$P_g^t + RegUp_g^t \leq P_g^{OpRegMax;t}; \ g \in G; \ t \in T$$

Of course, a resource can provide Regulation Reserve only if it is committed, i.e.:

$$k_g^t \leq u_g^t$$

$$RegDn_g^t + RegUp_g^t \leq k_g^t \cdot (P_g^{RegMax;t} - P_g^{RegMin;t}); \ g \in G; \ t \in T$$

In some embodiments, the invention may further comprise systems and methods to model and utilize resource ancillary service limits. The Regulation Reserve procurement is limited by regulating ramp rates and Regulation Reserve time domain:

$$RegDn_g^t \leq RR_g^{RegDn} \cdot T_{dom}^{Reg}; \ g \in G; \ t \in T$$

$$\text{RegUp}_g^t \leq RR_g^{RegUp} \cdot T_{dom}^{Reg}; \ g \in G; \ t \in T.$$

The Spinning Reserve is limited by emergency ramp rate and Spinning Reserve time domain:

$$\text{SpinRes}_g^t \leq RR_g^{Emr} \cdot T_{dom}^{Spin}; \ g \in G; \ t \in T$$

The Supplemental Reserve can be provided by online and offline resources. The online Supplemental Reserve is limited by normal ramp rate and Supplemental Reserve time domain:

$$\text{SuplONRes}_g^t \leq u_g^t \cdot RR_g^{Normal} \cdot T_{dom}^{Supl}; \ g \in G; \ t \in T.$$

For offline generation resources, the notification time can be considered as well:

$$\text{SuplOFFRes}_g^t \leq q_g^t \cdot RR_g^{Normal} \cdot (T_{dom}^{Supl} - T_g^{StartTime})$$

$$q_g^t + u_g^t \leq 1; \ g \in G; \ t \in T$$

The awarded reserve quantities are preserved in reliability applications. During offline Supplemental Reserve procurement the resource stays offline including the minimum down time before that period.

In some embodiments, the invention may further comprise systems and methods to model and utilize the following resource inter-temporal constraints represented according to any known method known in the art:

Minimum up time constraints
Maximum up time constraints
Minimum down time constraints
Maximum number of starts constraints Some embodiments may utilize a self-commitment constraint. The resource self-commitment status may violate resource inter-temporal constraints, i.e. for self-committed time intervals resource inter-temporal constraints are not enforced.

Some embodiments may utilize resource initial and final conditions. Resource initial conditions are derived from commitment history and resource operation projection till beginning of time period.

The final condition at the end of time period is determined in the way that resource can be shut down at the first time interval of the next day.

Some embodiments may utilize notification and startup time constraints. A startup time function represents stepwise non-decreasing function of cooling time. Startup time may be specified for hot, warm and cold resource warmth state. The hot-to-warm and warm-to-cold transition times for start time function are the same as for startup cost function.

The startup time is considered at the beginning of time period in conjunction with resource notification time. If a resource cannot be notified on time to be started then that resource is treated offline at the beginning of time period.

In some embodiments, the invention may further comprise systems and methods to model and utilize resource ramping limits. For resources that can ramp with a constant upward or downward ramp rate across its operating range, the constant ramping limits are enforced.

Where it is assumed that the resource before shutdown can ramp down to minimum power output only half of ramping time.

For resources with variable ramp rates over resource operating range, the dynamic ramping limits are enforced. In this case, the ramp rates can be general stepwise functions of resource operating points. Break points for both upward and downward ramp rate functions are the same.

In some embodiments, the invention may further comprise systems and methods to model and utilize joint owned units. The joint owned units can submit cumulative or separate offers for each share. If cumulative offer is submitted than joint owned unit is processed as regular generation resource.

If separate offers are submitted for each joint owned unit share, then offers are awarded separately respecting physical limitations for joint owned unit operation, as follows:

Joint owned unit shares are committed simultaneously:

$$u_{share1}^t = u_{share2}^t = \ldots = u_{shareN}^t; \ \text{share} \in JOU$$

Joint owned unit share awards are limited to ownership percentage of physical JOU capability if ownership information is provided:

$$P_{share}^t \leq p_{share} \cdot P_{JOU}^{max}$$

Joint owned unit cumulative awards is limited by joint owned unit physical capability if ownership information is not provided:

$$P_{JOU}^t = \sum_{share \in JOU} P_{share}^t \leq P_{JOU}^{max}.$$

In some embodiments, the invention may further comprise systems and methods to model and utilize combined cycle plants. The combined cycle plants may be represented as multi-state resources where each resource state represents a combined cycle plant configuration. The transition matrix then may define possible configuration transitions. The transitions can be upward (when at least one generating unit is started) or downward when some generating unit is shut down and none generating unit is started.

Each combined cycle plant configuration is treated as separate generating resource. If a combined cycle unit within a configuration is not available then alternate combined cycle unit is considered.

A status, startup, shutdown and an auxiliary variable are introduced for each configuration of combined cycle plant. The combined cycle plant configuration status, startup and shout down variables are defined in the same way as for any other generation resource.

The combined cycle plant configuration startup variables for a configuration are determined by possible transitions from one configuration into another configuration.

Shut down variables are determined by possible transitions from one configuration into another configuration.

For each combined cycle plant transition some configuration must start up and some configuration must shut down; therefore the constraint for maximum number of combined cycle plant transition during study time period can be expressed using combined cycle plant configuration startup variables only:

$$\sum_{t \in cT} \sum_{c \in CCP} S_c^t \leq MaxNumOfCCPTransitions.$$

During upward transition time the power output of from combined cycle plant configuration should be at maximum:

$$P_j^t \geq t_{j;c}^{up;t} \cdot P_{max;j}^t \ j \in c_{up}$$

and during downward transition time the power output of from combined cycle plant configuration should be at minimum:

$$P_j^t \leq t_{c;j}^{dn;t} \cdot P_{min;c}^t \ j \in c_{dn}$$

Possible transitions are defined by combined cycle plant transition matrix.

Specifically for combined cycle plants, a commitment constraint is added to enforce combined cycle plant operation only in one configuration including combined cycle plant offline mode in any time interval:

$$\sum_{c \in CCP} u_c^t = 1; \quad t \in T.$$

The inter-temporal constraints (static ramping limits, minimum up time and maximum number of starts) can be enforced for each combined cycle plant configuration individually in the same way as for standard generation resources. The minimum down time constraints are considered only for all OFF configurations, i.e. when whole plant is offline.

The energy and ancillary service offers are configuration based within certain embodiments of the inventive system and method. It is not necessary that offers are submitted for all registered combined cycle plant configurations. Only configurations with submitted offers are considered in optimization according to connectivity of their transitions. The offline supplemental reserve can considered only for all OFF configurations. The energy and ancillary service offer costs are incorporated into optimization objective.

Instead of startup costs, the upward transition costs are added into optimization objective:

$$\sum_{i;j \in TransMatrix} t_{i,j}^t \cdot TUC_{i,j}^t.$$

The No Load Cost Offers and Minimum Energy Cost Offers can be considered for each combined cycle plant configuration and in some embodiments the combined cycle plant Startup Costs Offers are submitted as Transition Cost Offers from all OFF configuration.

The augmented combined cycle plant states can be treated as separate combined cycle plant configurations or as extension of operating range of the existing configurations (typically with higher energy offer prices). Augmented configurations and correspondent combined cycle units are registered as separate resources.

The energy awards for combined cycle plant configurations are distributed to physical combined cycle units in proportion of submitted weighted distribution factors. If aggregation factors are not submitted then distribution factors are based on combined cycle unit capacities.

Only commitment statuses and power outputs of combined cycle units are considered by Network Applications.

In some embodiments, the invention may further comprise systems and methods to model and utilize intermittent generation resources. The intermittent generation resources can submit energy and ancillary service offers as any other generation resource using the systems methods of the invention. The intermittent generation resources are treated always online without ramping limitations. The power output and ancillary service awards of intermittent generation resources are limited by forecasted wind power potential, i.e. the intermittent generation resource cannot be deployed above available power level:

$$P_g^{OpMin;t} \leq P_g^t - RegDn_g^t \leq P_g^{WPP;t}; \quad g \in IGR; t \in T$$

$$P_g^{OpMin;t} \leq P_g^t + RegUp_g^t + SpinRes_g^t + SuplRes_g^t \leq P_g^{WPP;t}; \quad g \in IGR; t \in T.$$

The intermittent generation resources can be aggregated within a wind or solar farm if the farm has only one point of interconnection. If farm includes firming storage devices controlled remotely then the farm can be treated as an energy storage resource.

In some embodiments, the invention may further comprise systems and methods to model and utilize energy storage resources where the energy storage resources are considered to operate in three states: charging, offline, and discharging. The dynamics of energy storage resource charging and discharging processes can vary from seconds, minutes, hours and days to even seasons and years. The energy storage resources with notification times and inter-temporal parameters comparable with market timeline will be considered.

The duration limited energy storage resources can cycle with negligible periodicity and they can be treated as online resources that can cycle continuously between charging and discharging operating modes. These resources can be dispatched from zero MW to maximum power in both charging and discharging directions.

In some embodiments, the systems and methods support the energy storage resources submitting three-part energy bids for charging energy and three-part energy offers for discharging energy. These bids and offers may include single value transition costs, minimum energy costs and incremental energy price curves for both charging and discharging operating modes.

The energy storage resources can provide online ancillary services in both charging and discharging operating modes. The offline Supplemental Reserve can be provided in offline operating mode only. Appropriate ancillary service offers can be submitted. It is assumed that starred energy is always sufficient to delivery awarded ancillary service.

A status, startup and shutdown variables are defined for both charging and discharging modes as known in the art. Also, resource charging/discharging power limits and inter-temporal constraints for both charging and discharging modes are enforced as usually.

The specifics for energy storage resources consists of energy storage capability. The storage capacity and efficiency of charging/discharging cycle are considered:

$$S_{ESP}^{t=0} = S_{ESR}^0; \quad S_{ESR}^{t=T} = S_{ESR}^T$$

$$S_{ESR}^{t+1} = \eta_{ESR}^s \cdot S_{ESR}^t + \eta_{ESR}^c \cdot P_{ESR}^{c;t} - (1/\eta_{ESR}^d) \cdot P_{ESR}^{d;t}; \quad t \in T$$

$$S_{ESR}^{min} \leq S_{ESR}^t \leq S_{ESR}^{max}; \quad t \in T$$

The systems and methods network can support different locations of charging load and discharging generation. In general, the operation of energy storage resource is determined by prices at different time intervals and prices at different network nodes.

The system dispatch can dispatch energy storage resource optimally with guaranteed positive benefits even if charging bid and discharging offer is not submitted.

In some embodiments, the invention may further comprise systems and methods to model and utilize demand response resources where such demand resources are treated as price driven reduction of consumption in respect to the base load. Typical demand response resources represent a site where a behind the meter generating resource is located.

The base load is netted with "generation" of demand resource:

$P_l^t = P_{BL}^t - P_g^t; \, l,g \in DR; \, t \in T$

For the generation part of demand response resource, a standard three-part offer that includes startup, minimum energy and incremental energy offers can be submitted. Also, AS offers can be submitted as usually. The demand resource offer costs are included into optimization objective of the invention.

The inter-temporal constraints and resource limits are enforced for demand resource.

In system power balance and transmission constraints, the effective load of demand response resources are considered, i.e. the base load of demand resource is netted with awarded generation part of demand resource.

In some embodiments, the invention may further comprise systems and methods to model and utilize load resources. A physical load resource can participate in electricity market symmetrically to generating resources utilizing the inventive systems and methods. This load resource can submit three-part bid for load curtailment and price sensitive dispatch. The three-part bid may include curtailment costs, interruption costs and energy price curve.

In curtailed operating mode there is no consumption. While in dispatchable operating mode, load can be dispatched between load resource operating minimum and maximum. A binary variable is introduced within the inventive systems and methods to indicate curtailed or dispatchable operating mode. Also, variables for transitions between operating modes (load interruption variable and curtailment end variable) are introduced in symmetrical way as status, startup and shutdown variables for generation resource.

In some embodiments, the invention may further comprise systems and methods to model and utilize the following load resource inter-temporal constraints represented according to any known method known in the art:

Minimum non-interruption time constraints
Maximum interruption time constraints
Maximum number of interruptions constraints Some embodiments may also utilize resource operating limits where the operating limits are enforced for interruptible load resource:

$u_l^t \cdot P_l^{OpMin;t} \leq P_l^t + \text{RegDn}_l^t \leq u_l^t \cdot P_l^{OpMax;t}; \, l \in ILR; \, t \in T$ $u_l^t \cdot P_l^{OpMin;t} \leq P_l^t - \text{RegUp}_l^t - \text{SpinRes}_l^t - \text{SuplRes}_l^t \leq u_l^t \cdot P_l^{OpMax;t}; \, l \in ILR; \, t \in T.$ The system and methods of the current invention depend on an ordered execution of model building utilizing various mathematical processes known in the art and the innovative order and collection of input elements entered into or otherwise obtained by the invention. In one particular embodiment, the invention comprises a system and method for determining market commodity pricing. The main features of competitive electricity market are efficient market clearing and competitive price formation. The economic efficiency of market clearing is provided within the inventive systems and methods by utilizing optimal resource commitments and optimal awarded quantities for energy and ancillary service commodities determined by system clearing. On the other side, the price formation mechanism of the present invention will determine settlement prices for awarded market commodities along with the following desired properties:

Competitive equilibrium prices, i.e. under settlement prices the awarded market commodities provide maximal profit for each individual market participant.

Individual rationality, i.e. each market participant will have non-negative profit without out-of-market payments.

Incentive capability, i.e. the best strategy for each market participant is truthful submission of offers and bids.

Transparency, i.e. settlement prices are unanimous; not resource specific.

Budget balance, i.e. market budget is non-negative to enable sustainable market operation without external subsidy.

Note that it is impossible to satisfy all these principles simultaneously. For example, the marginal cost based settlement prices cannot be incentive compatible, i.e. market power on both supply and demand side always exists.

A marginal cost based price formation mechanism for electricity market commodities is designed to support a variety of existing pricing policies and minimize violations of above pricing principles. The proposed pricing schema of the described invention fulfills thee above price formation criteria (except incentive compatibility) within variety of electricity market environments. The omission of incentive compatibility is due to design impossibility and remains the subject for market power mitigation measures known in the art.

The main problem of price formation in electricity market is the determination of marginal settlement prices for fixed market commodities, which is mathematically impossible. The system pricing schema represents a variety of price formation mechanisms that deploy a Quadratic Programming optimization solver to calculate shadow prices for system requirements (system power balance and ancillary service reginal requirements) and shadow prices for transmission constraints. Different settings are needed for different pricing schema types, as follows below.

The optional feature selection and dispatch range settings can accommodate all existing pricing schemas as well invented advanced pricing schema. A setting is possible where out-of-market payments to guaranty cost recovery and incentivize market commodity awards as well (recommended).

Some embodiments of the invention may comprise settings attuned to a time interval independency. Here, the optimal awards for market commodities incorporate all interdependencies of time intervals, like ramping constraints, inter-temporal constraints, daily energy limits. To avoid cost transition from one time interval to another, the settlement prices for awarded market commodities are determined for each time interval separately within the ordered structure of the systems and methods of the disclosed invention. It is assumed that the optimal schedules for awarded market commodities will be followed in real-time.

The optimal awards for market commodities for previous time interval are treated as starting point to determine settlement prices for the current time interval. All ramping and inter-temporal constraints are built into resource dispatch limits for the current time interval. Also, impacts of resource initial conditions and uneconomic pre-ramping are eliminated.

Under these settings the Pricing Engine solves a set of independent single-interval optimization problems to determine settlement prices for all time intervals within market time period.

Depending on policy and market design, some resources are not eligible to participate in price formation for awarded market commodities. In the Pricing Engine the following options are provided for some embodiments where resource eligibility is pertinent: Not committed resources are (not) eligible to set settlement prices, committed minimum energy blocks are (not) eligible to set settlement prices, minimum energy blocks for lumpy fast-start resources are/not eligible to set price, pre-ramped resources are (not) eligible to set settlement prices, interruptible load resources are/not eligible to set settlement prices, fixed transactions are (not) eligible to set settlement prices, and time-block transactions are (not) eligible to set settlement prices.

All incremental energy bids and offers are eligible to set settlement prices. The self-committed minimum energy blocks and self-scheduled energy quantities are treated as price takers.

The settlement prices for ancillary services are determined by ancillary service offers in conjunction to energy lost opportunity costs, while ancillary service self-procurements are treated as price takers.

In some embodiments, the invention may further comprise systems and methods to model settings for a dispatching pricing schema where all committed dispatchable resources, i.e. only offers and bids for flexible market commodities, are eligible to set market clearing prices. An embodiment of the invention with a dispatching pricing schema price formation mechanisms comprises of the following steps: fix resource commitment statuses at optimal values, enforce ramping up and down limits (optional), execute Quadratic Programming optimization solver, calculate Locational Marginal Prices and their energy, loss and congestion components, and calculate regional ancillary service settlement prices.

Fixed market commodities are treated as price takers, i.e. they are treated as free market commodities. This price formation mechanism depress the market clearing prices across system resulting in underpriced fixed market commodities. These settlement prices are not individually rational and they cause market budget deficit.

In some embodiments, the invention may further comprise systems and methods to model settings for a relaxed pricing schema where eligible committed resources, i.e. offers and bids for both fixed and flexible market commodities, can set market clearing prices. An embodiment of the invention with a relaxed pricing schema price formation mechanisms comprises of the following steps: Relax committed minimum energy blocks to be dispatchable anywhere between zero MW and operating minimum, adjust offer price for minimum energy block to incorporate no load costs and a share of startup costs, convexify extended energy offer curve over full dispatchable range from zero MW to operating maximum, enforce resource ramping up and down limits (optional), execute Quadratic Programming optimization solver, calculate Locational Marginal Prices and their energy, loss and congestion components, and calculate regional ancillary service settlement prices.

In this embodiment, fixed market commodities are made flexible and able to set settlement prices. The system dispatch is hypothetical and settlement prices do not reflect actual operating costs and benefits. Still, this price formation mechanism is not individually rational nor budget balanced.

In some embodiments, the invention may further comprise systems and methods to model settings for a partial commitment pricing schema where resource commitment statuses are continuous variables relaxed between zero and one to enable both fixed and flexible market commodities to set market clearing prices. An embodiment of the invention with a partial commitment pricing schema price formation mechanisms comprises of the following steps: relax resource commitment status binary variable to be continuous between zero and one, enforce resource ramping up and down limits (optional), execute Quadratic Programming optimization solver, calculate Locational Marginal Prices and their energy, loss and congestion components, and calculate regional ancillary service settlement prices.

The binary variables representing resource commitment statuses are relaxed so resource can be partially committed, i.e. a fraction of resource could be online and fraction of resource could be offline at the same time interval. Fixed market commodities are becoming flexible and may set settlement prices for both online and offline market commodities. But, the system dispatch and resource commitments are hypothetical and settlement prices do not reflect actual operating costs and benefits.

In some embodiments, the invention may further comprise systems and methods to model settings for an advanced pricing schema where the eligible committed resources, i.e. offers and bids for both fixed and flexible market commodities, can set market clearing prices while resource dispatch points are preserved. An embodiment of the invention with an advanced pricing schema price formation mechanisms comprises of the following steps: relax committed minimum energy blocks to be dispatchable anywhere between zero MW and operating minimum, adjust offer price for minimum energy block to incorporate no load costs and a share of startup costs, enforce resource ramping up and down limits (optional), set narrow limits around awarded incremental energy to be dispatchable only in that range, execute Quadratic Programming optimization solver, calculate Locational Marginal Prices and their energy, loss and congestion components, and calculate regional ancillary service settlement prices.

The most expensive units of awarded market commodities (fixed or flexible) determine settlement prices. To discover these marginal market commodity prices, fixed market commodities are made flexible and able to set settlement prices, but awards for flexible market commodities are preserved by narrow dispatch limits. The system dispatch is preserved and settlement prices reflect actual operating costs and benefits at awarded values of market commodities. The advanced price formation mechanism is individually rational and budget balanced without out-of-market subsidy. A marginal costs based pricing schema is designed to support a variety of existing pricing policies and minimize violations of above pricing principles. It is possible to arrange settings of the proposed system advanced pricing schema to satisfy all above criteria except incentive compatibility. This omission is subject to market power mitigation measures.

In some embodiments, the locational marginal prices are calculated in standard way when determining settlement price calculation; using shadow prices for system power balance and transmission line constraints, as follows:

$$LMP_{node}^t = \lambda_{sys}^t - \lambda_{sys}^t \cdot \alpha_{rnode}^t + \sum_{line \in N} PTDF_{line}^{node} \cdot \eta_{line}^t$$

In the system pricing schemas described above, the locational marginal prices fully reflect startup, no-load/minimum energy costs of committed resources in variety of manner.

The calculated locational marginal prices represent settlement prices for energy that consist of three price components:

$$LMP_{node}^{En;t} = \lambda_{sys}^t \qquad \text{–Energy component}$$

$$LMP_{node}^{loss;t} = \lambda_{sys}^t \cdot \alpha_{rnode}^t \qquad \text{–Energy loss component}$$

-continued $$LMP_{node}^{cong;t} = \sum_{line \in N} PTDF_{line}^{node} \cdot \eta_{line}^{t} \quad \text{—Transmission congestion component}$$

To further clarify and describe the above notation used within the current application, the applicant provides the below Notation tables:

Variables $u_g^t$ is status variable for generating unit g at time interval t
$s_g^t$ is startup variable for generating unit g at time interval t
$r_g^t$ is shutdown variable for generating unit g at time interval t
$k_g^t$ is regulation mode variable for generating unit g at time interval t
$u_l^t$ is status variable for load l at time interval t
$s_l^t$ is curtailment end variable for load l at time interval t
$r_l^t$ is curtailment start variable for load l at time interval t
$h_t$ is resource hot state at time interval t
$w_t$ is resource warm state at time interval t
$c_t$ is resource cold state at time interval t Commodities $P_g^t$ is power output for generating unit g at time interval t
$P_l^t$ is power consumption for load l at time interval t
$P_v^t$ is power injection for virtual offer/bid v at time interval t
$P_w^t$ is power injection for financial offer/bid w at time interval t
$AS_g^t$ is AS reserve for generating unit g at time interval t
$AS_l^t$ is AS reserve for load l at time interval t
$RegDn_r^t$ is Regulation Down for resource r at time interval t
$RegUp_r^t$ is Regulation Up for resource r at time interval t
$SpinRes_r^t$ is Spinning Reserve for resource r at time interval t
$SuplRes_r^t$ is Supplemental Reserve for resource r at time interval t
$R_r^{Up;t}$ is ramping up service for resource r at time interval t
$R_r^{Dn;t}$ is ramping down service for resource r at time interval t
$T_{dom}^{Reg}$ is Regulation Reserve time domain
$T_{dom}^{Spin}$ is Spinning Reserve time domain
$T_{dom}^{Supl}$ is Supplemental Reserve time domain Resource Parameters $P_g^{EcoMin;t}$ is economic minimum for resource g at time interval t
$P_g^{EcoMax;t}$ is economic maximum for resource g at time interval t
$P_g^{OpMin;t}$ is operating minimum for resource g at time interval t
$P_g^{OpMax;t}$ is operating maximum for resource g at time interval t
$P_g^{RegMin;t}$ is regulating minimum for resource g at time interval t
$P_g^{RegMax;t}$ is regulating maximum for resource g at time interval t
$RR_g^{Dn}$ is ramp rate down for resource g
$RR_g^{Up}$ is ramp rate up for resource g
$T^{ramp}$ is ramping time Costs/Benefits $EB_{market}^{total}$ is total market Economic Benefit
$SUC_g^t(\bullet)$ is Start Up Cost for generating unit g at time interval t
$SUC_t^h$ is hot Start Up Cost at time interval t
$SUC_t^w$ is warm Start Up Cost at time interval t
$SUC_t^c$ is cold Start Up Cost at time interval t
$MEC_g^t$ is Minimum Energy Cost for generating unit g at time interval t
$EOP_g^t(\bullet)$ is Energy Offer Price for generating unit g at time interval t
$EOC_g^t(\bullet)$ is Energy Offer Cost for generating unit g at time interval t
$ASP_g^t(\bullet)$ is AS Price for generating unit g at time interval t
$ASC_g^t(\bullet)$ is AS Cost for generating unit g at time interval t
$LIC_l^t$ is Load Interruption Cost for load l at time interval t
$LCC_l^t$ is Load Curtailment Cost for load l at time interval t
$EBP_l^t(\bullet)$ is Energy Bid Price for load l at time interval t
$EBB_l^t(\bullet)$ is Energy Bid Benefit for load l at time interval t
$ASP_l^t(\bullet)$ is AS Price for load l at time interval t
$ASC_l^t(\bullet)$ is AS Cost for load l at time interval t
$EOP_v^t(\bullet)$ is Energy Offer price for virtual trader v at time interval t
$EOC_v^t(\bullet)$ is Energy Offer Cost for virtual trader v at time interval t
$EBP_v^t(\bullet)$ is Energy Bid Price for virtual trader v at time interval t
$EBB_v^t(\bullet)$ is Energy Bid Benefit for virtual trader v at time interval t
$EOP_w^t(\bullet)$ is Energy Offer Price for financial trader w at time interval t
$EOC_w^t(\bullet)$ is Energy Offer Cost for financial trader w at time interval t
$EBP_w^t(\bullet)$ is Energy Bid Price for financial trader w at time interval t
$EBB_w^t(\bullet)$ is Energy Bid Benefit for financial trader w at time interval t Network Model $P_{node}^t$ is net power injection variable at network node at time interval t
$P_{node}^{NA;t}$ is calculated net power injection at network node at time interval t
$P_{sys}^{loss}(\bullet)$ is network loss model
$P_{loss}^{NA;t}$ is calculated network losses at time interval t
$\alpha_{node}^t$ is loss factor for network node at time interval t
$F_{line}^t$ is active power flow for transmission line at time interval t
$F_{line}^{NA;t}$ is calculated active power flow for transmission line at time interval t
$F_{line}^{max;t}$ is maximal active power flow for transmission line at time interval t
$PTDF_{line}^{node}$ is shift factor for transmission line network node Infeasibilities $P_{over}^t$ is system over generation at time interval t
$P_{under}^t$ is system under generation at time interval t
$AS_{under}^t$ is AS at time interval t
$F_{line}^{over;t}$ is overload for transmission line at time interval t Penalties $PBP_{over}^t(\bullet)$ is over generation Power Balance Penalty at time interval t
$PBP_{under}^t(\bullet)$ is under generation Power Balance Penalty at time interval t
$ASP_{under}^t(\bullet)$ is AS insufficiency Penalty at time interval t
$TCP_{line}^{over;t}(\bullet)$ is violation Transmission Constraint Penalty at time interval t Sets $t \in T$ is time interval t within time period T
$g \in G$ is generating unit g within generation fleet G
$l \in L$ is load l within load set L
$r \in G \cup L$ is set of generation and load resources
$v \in VO$ is virtual offer v within virtual offer set VO
$v \in VB$ is virtual bid v within virtual bid set VB
$w \in WO$ is financial offer v within virtual offer set WO w ∈ WB is financial bid v within virtual bid set WB
line ∈ N is transmission line within network N
node ∈ N is network node within network N

The invention claimed is:

1. A method using smart grid technologies that bring in distributed, decentralized grid asset data and information into for the next generation of electricity market systems, said next generation of electricity market system that supporting competitive trading of electric energy and ancillary services within day-ahead and real-time market operation frameworks consisting of the following steps, which are a combination of known process steps, accomplished through any means currently known in the art, and novel steps:
   a) Novel Trading platform facilitating market executions, auditing re-runs and study analysis comprising information storages and archival, wherein workspaces support system execution in operation and study environments;
   b) Modeling of energy storage resources with notification times and inter-temporal parameters comparable with market timeline;
   c) Novel Workflow controller facilitating solution sequences and iteration procedures, wherein said workflow controller to facilitate and manage system solution sequences;
   d) Topology Processor determining network topology;
   e) Pre-Processor validating market input data;
   f) SCUC engine optimizing resource commitments and awarded quantities of market commodities;
   g) SCED engine optimizing awarded quantities of market commodities respecting optimal resource commitments;
   h) NA engine formulating transmission constraints;
   i) Novel Pricing engine determining awarded market commodity settlement prices, and
   j) Novel Post-Processing validating and delivering market clearing and pricing outcomes to downstream systems.

2. The method of claim 1, further comprising a variety of solution steps, wherein said Solution Sequences facilitate and manage system execution.

3. The method of claim 1, further comprising optimal resource commitments and market commodity quantities, wherein said SCUC engine to maximize economic efficiency of electricity market operation while ensuring electric power system reliability and solution quality.

4. The method of claim 3, further comprising optimization method, wherein said Mixed Integer Linear Programming and Quadratic programming solvers are utilized to determine optimal resource commitments and market commodity quantities.

5. The method of claim 1, further comprising optimal market commodity quantities for optimal resource commitments, wherein said SCED engine is utilized to maximize economic efficiency of electricity market operation while ensuring electric power system reliability and solution quality.

6. The method of claim 5, further comprising optimization method, wherein said Mixed Integer Linear Programming and Quadratic programming solvers to determine optimal market commodity quantities for the optimal resource commitments.

7. The method of claim 3, further comprising mathematical modeling, wherein said mathematical formulations are utilized to specify market operation objectives, constraints and characteristics in mathematical form.

8. The methods of claim 7, further comprising optimization objective, wherein said objective function is utilized to specify market economic efficiency in a variety of market arrangements.

9. The methods of claim 7, further comprising energy supply and demand balance, wherein said system power balance is utilized to specify main constraint in a variety of market arrangements.

10. The methods of claim 7, further comprising required regional ancillary service procurements, wherein said ancillary service requirements are utilized to specify regional ancillary service constraints in a variety of market arrangements.

11. The methods of claim 10, further comprising ancillary service cascading, wherein said ancillary service substitution is utilized to specify lower quality ancillary service replacement with higher quality ancillary services.

12. The methods of claim 7, further comprising system security, wherein said transmission constraints are utilized to formulate transmission line power flow limits for base case and a variety of contingency cases.

13. The methods of claim 7, further comprising resource operating constraints and limits, wherein said resource constraints to formulate the following resource characteristics:
   a) Commitment status, startup and shutdown variables
   b) Operating and regulating ranges
   c) Static ramping limits
   d) Dynamic ramping limits
   e) Startup cost function for hot, warm and cold warmth states
   f) Minimum up and down times
   g) Maximum up time
   h) Maximum number of starts
   i) Commitment interdependency for joint owned units
   j) Storage constraints for energy storage resources
   k) Multi-state transition constraints for combined cycle plants.

14. The method of claim 7, further comprising a market commodity pricing, wherein said pricing engine to determine settlement prices for awarded market commodities.

15. The method of claim 14, further comprising a price formation mechanism, wherein said pricing schema for a variety of price formation processes as follows:
   a) Dispatching pricing schema to determine prices for flexible market commodities
   b) Relaxed pricing schema for fixed and flexible market commodities with hypothetical system dispatch
   c) Partial commitment pricing schema allowing fractional resource commitments, and
   d) Advanced pricing schema for fixed and flexible market commodities with preserved actual system dispatch.

16. The method of claim 5, further comprising mathematical modeling, wherein said mathematical formulations are utilized to specify market operation objectives, constraints and characteristics in mathematical form.

* * * * *